Figure 1:
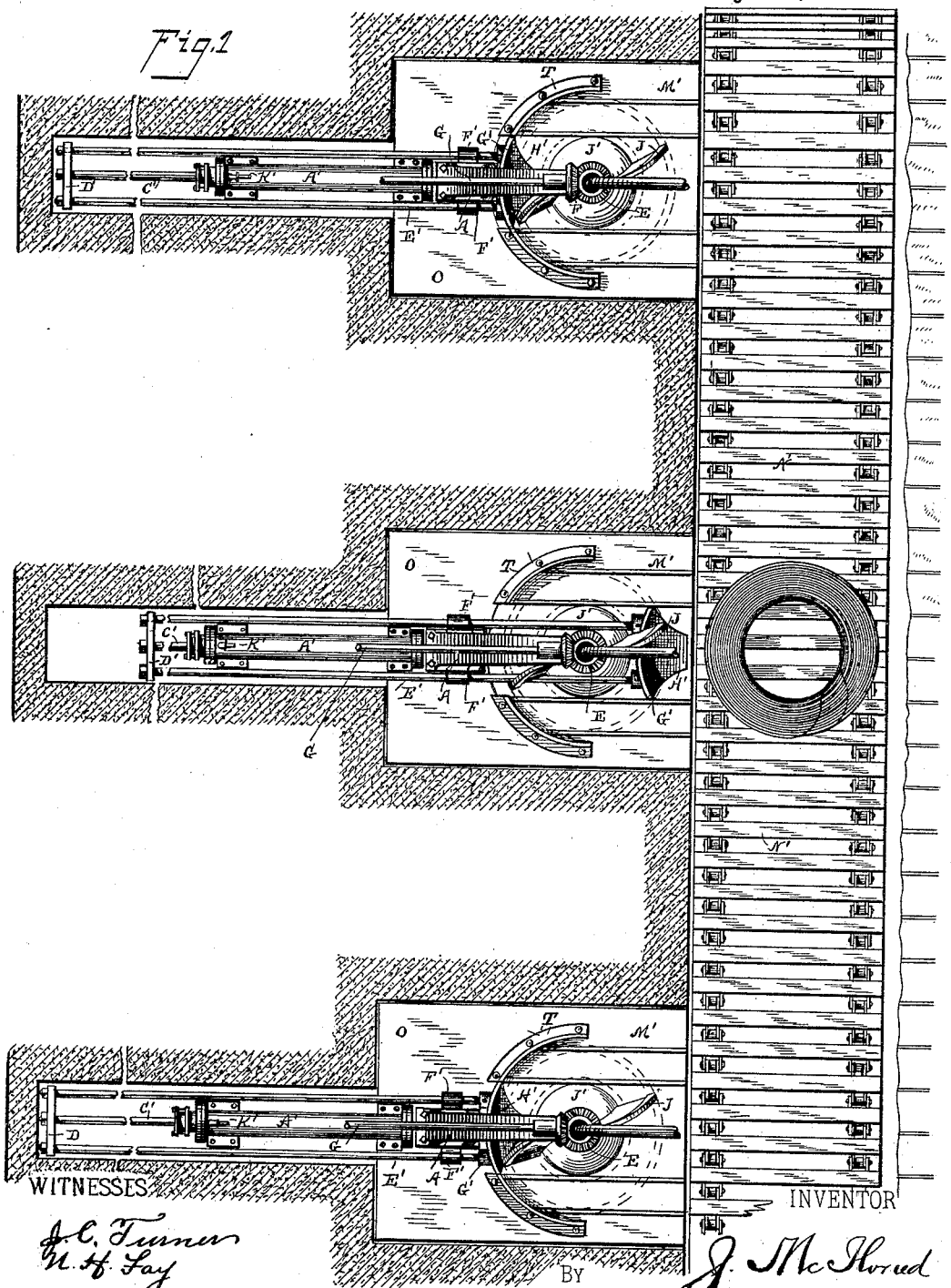

(No Model.) J. McILVRIED. 6 Sheets—Sheet 1.
REEL FOR COILING WIRE.
No. 452,889. Patented May 26, 1891.

WITNESSES
INVENTOR
BY
his ATTORNEYS (No Model.) 6 Sheets—Sheet 4.

J. McILVRIED.
REEL FOR COILING WIRE.

No. 452,889. Patented May 26, 1891.

WITNESSES
J. C. Turner
N. H. Fay

INVENTOR
J. McIlvried
BY Hall and Fay
his ATTORNEYS (No Model.)  6 Sheets—Sheet 5.

J. McILVRIED.
REEL FOR COILING WIRE.

No. 452,889.  Patented May 26, 1891.

WITNESSES  INVENTOR (No Model.) 6 Sheets—Sheet 6.

J. McILVRIED.
REEL FOR COILING WIRE.

No. 452,889. Patented May 26, 1891.

WITNESSES
J. C. Turner
N. H. Fay

INVENTOR
J. McIlvried
Hall and Fay
his ATTORNEYS

UNITED STATES PATENT OFFICE.

JOHN McILVRIED, OF CLEVELAND, OHIO, ASSIGNOR OF THREE-FOURTHS TO STEWART H. CHISHOLM, OF SAME PLACE.

REEL FOR COILING WIRE.

SPECIFICATION forming part of Letters Patent No. 452,889, dated May 26, 1891.

Application filed September 22, 1890. Serial No. 365,754. (No model.)

*To all whom it may concern:*

Be it known that I, JOHN MCILVRIED, a citizen of the United States, and a resident of Cleveland, in the county of Cuyahoga and State of Ohio, have invented certain new and useful Improvements in Reels, of which the following is a specification, the principle of the invention being herein explained and the best mode in which I have contemplated applying that principle, so as to distinguish it from other inventions.

My invention relates to apparatus for coiling wire rods; and it consists in the improved construction and arrangement or combination of parts hereinafter fully disclosed in the description, drawings, and claims.

In reeling devices for wire rods as they have heretofore been constructed and at present are used one operative has been employed in serving the wire rod to the reel and attending the machine and another operative or several operatives have been employed in removing the finished coils from the reels and in conveying them away from the machine. The removal of the finished coils from the reels and consequent stoppage in the reeling process has rendered a great number of reels necessary for each set of rolls to admit of the immediate reeling of the finished rods, or said rods have been allowed to loosely loop up on the floor of the mill, to thereupon be reeled up by reels running at a so much higher speed than the rolls that they can reel the rods faster than they are delivered from the rolls, and thus catch up with the loose portions looped up on the floor. However, in reeling up these loose looped portions of the rods said rods are often liable to be snarled, doubled up, or broken, rendering the finished product undesirable, and, after all the slack has been reeled up, the reel, winding faster than the rolls can deliver, will draw the wire through said rolls and will draw the single coils upon the reel into one another, so that the finished coil will be uneven and difficult to unwind.

It is the object of my invention to avoid these disadvantages and to provide improved means for perfectly and smoothly winding the coils of wire rod, to provide improved means for quickly removing the finished coils from the apparatus and thereby making the process of reeling practically continuous, to provide improved means for guiding the wire rods, and to provide improved means for quickly removing the finished coils from the machine and conveying them away from the same.

Figure 2:
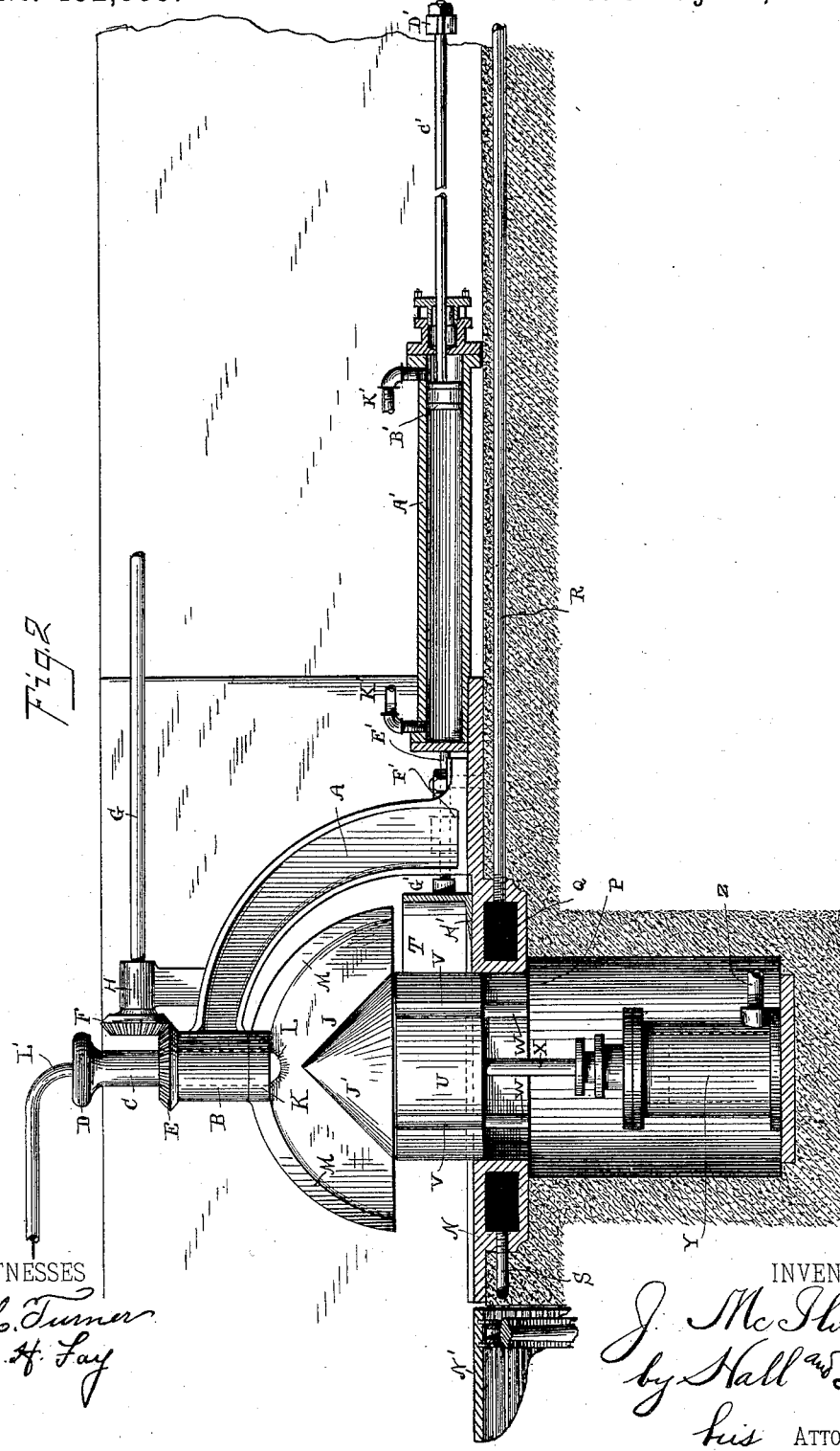
Figure 3:
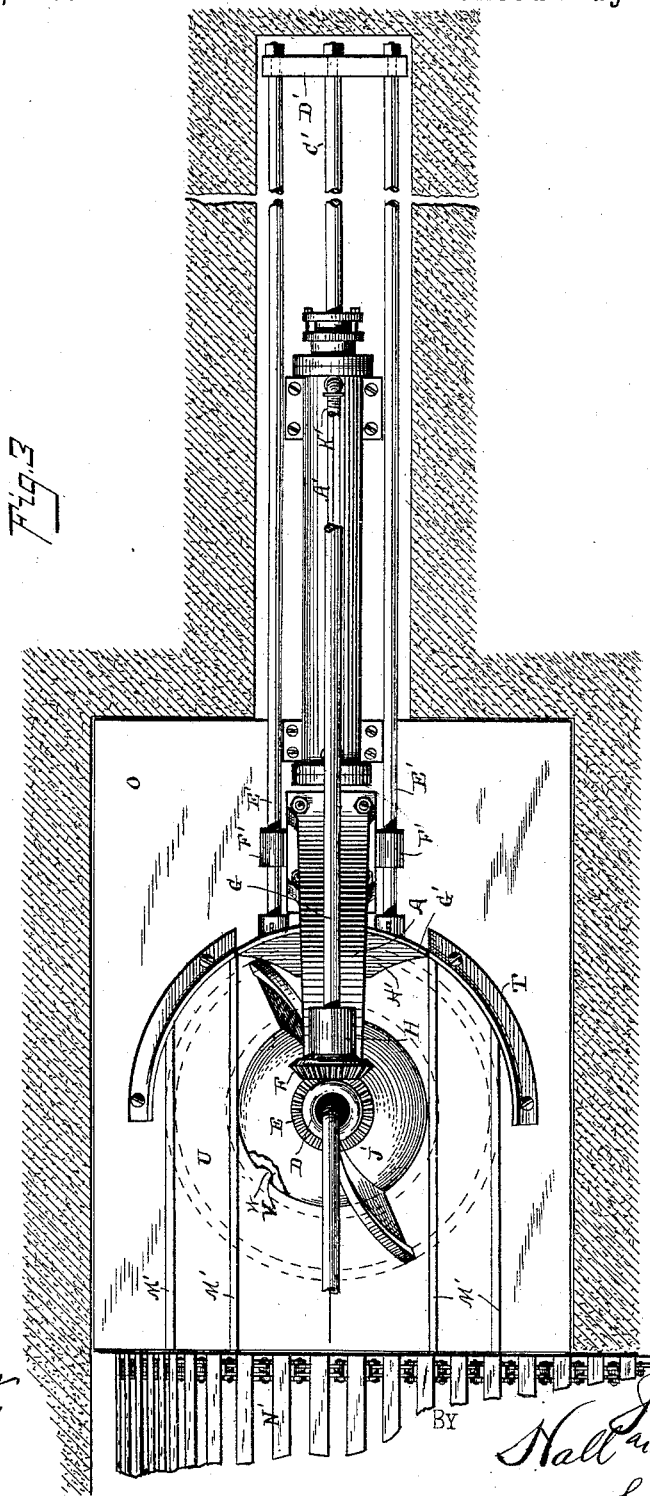
Figure 4:
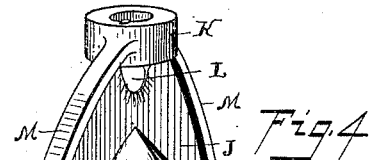
Figure 5:
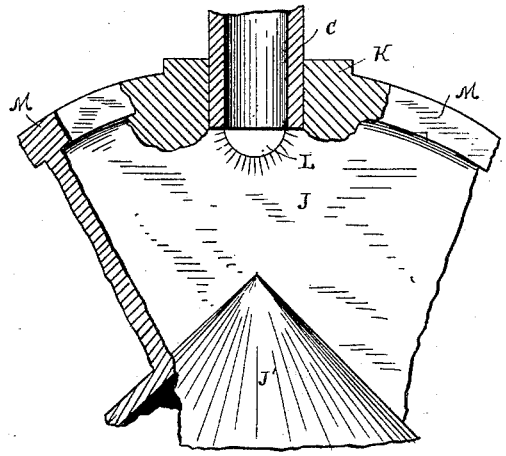
Figure 6:
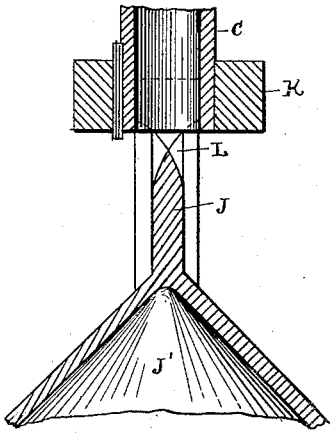

Referring to the drawings, Figure 1 represents a top plan view of a series of my improved apparatus for coiling wire rods and of their endless conveyer; Fig. 2, a side elevation, partly in section, of one of the apparatus; Fig. 3, a top plan view of the same; Fig. 4, a perspective view of the coiling-cone; Figs. 5 and 6, sectional detail views of the upper end of the cone; and Figs. 7, 8, 9, and 10, side elevations, partly in section, of modified forms of the apparatus.

In the drawings, the letter A indicates a support or curved arm, the end of which is formed with a vertical bearing B. A tubular guide spindle or tube C, having a funnel-shaped mouth-piece D at its upper end, is journaled in said vertical bearing B and has a bevel cog-wheel E keyed or otherwise secured upon it above said bearing. Said cog-wheel meshes with a similar cog-wheel F, which is secured upon a drive-shaft G, having a bearing H upon the top of the support and receiving revolving motion from any suitable source. A flaring winder or coiling-cone J' has a wall J secured to its outer side, straddling it at its apex, and said wall is semicircular, or nearly so, upon its outer edge and has its arms or legs slightly curved, with a sweep or curve in the direction opposite to the direction in which the coiling-cone revolves, said arms forming open coiling-guides for the wire rod. Above the apex of the coiling-cone the wall is formed with a collar K, which is keyed upon the lower end of the tubular guide-spindle, and an opening L, having its edge beveled or rounded to both sides, is formed in the wall below said collar and corresponds in width to the inside diameter of the tubular guide-spindle. The outer round edges of the arms of the wall are formed with lateral flanges M, so that they will be T-shaped in cross-section.

The bed-plate N of the apparatus is preferably arranged in the bottom of a pit or trench O and is formed with a circular opening P of the same diameter as the base diameter of the coiling-cone and surrounded by a water jacket or chamber Q, which has an inlet-pipe R and an outlet-pipe S. A semicircular shield or wall T is secured concentric with the opening P upon the bed-plate and serves to deflect the end of the wire rod around the mandrel when said rod passes through the coiling-cone and to limit the size of the coils formed by the machine. A cylindrical mandrel or core U, upon which the coil is wound, slides in said opening P, and for the purpose of preventing said mandrel from turning when the wire rod is wound upon it the sides of the mandrel are formed with vertical grooves V, which fit and slide upon vertical ribs W upon the sides of the opening P. The mandrel is secured upon the upper end of a piston-rod X, the piston of which reciprocates in a steam, water, or air cylinder Y, provided at its lower with an inlet and exhaust pipe Z, having suitable means for letting in and exhausting steam, water, or air for raising or lowering the piston, piston-rod, and mandrel.

A steam, air, or water cylinder A' is arranged radiating from the bed-plate, and preferably outside of the arm or support A, and a piston B' and piston-rod C' slide in said cylinder. The outer end of said piston-rod C' has a cross-head D', to the ends of which are secured two rods E' E', which extend parallel with the cylinder and at the sides of the same and slide in horizontal bearings F' in the arm or support A. A curved pushing-head G', having a wedge-shaped bottom flange H' for engaging under the finished coils, is secured to the ends of said rods E'. Two pairs of parallel rails M' are formed upon the bed-plate and form supports upon which the coils may rest and slide, and the pushing-head G' slides and is guided between the inner pair of said rails. The cylinder A' has suitable supply and exhaust pipes K' for the liquid medium which actuates the piston, and when the piston is moved inward the pushing-head will be slid across the bed-plate between the guide-rails and over the lowered mandrel. The wire rod is conveyed from the rolls or from the mill-floor to the funnel-shaped mouth-piece of the guide-tube C by a pipe L', the end of which is curved into said mouth-piece. An endless conveyer N', of any suitable or desired construction capable of receiving the red-hot coils of rod, is arranged to have its upper surface at a level with the bed-plate and with one edge at the edge of said bed-plate. Said conveyer is continually in motion, so that the finished coils may be pushed out upon it by the pushing-head and be carried away by it.

The operation of the apparatus is as follows: The wire rod passes from the rolls through the guide-pipe L' into the guide-tube C, the funnel-shaped mouth-piece of which guides the rod through it. As the end of the rod emerges from the guide-tube it will strike the beveled or rounded edge of the opening L in the apex of the wall upon the coiling-cone and be deflected to either one or the other side of the wall by said edge. One arm of the flange upon the coiling-cone will now catch the rod and carry it around the mandrel, the shield deflecting the end of the rod and causing it to be wound upon the mandrel in a gradually-increasing coil. As the wire rod is reeled from above upon the mandrel and the wall is of a sufficient width to allow radial play for the rod as the coil grows larger, the rod will be wound in a perfect coil and will not be drawn and twisted one coil into another, as is often the case in wire-rod reels having reels formed with spokes and having guides at the sides of the reels. The water-jacket will keep the base-plate cool under the influence of the heat from the wire rod being coiled upon it. When the end of the wire rod which is being reeled is reached and the coil is completed, the mandrel is lowered by means of its cylinder and piston-rod, and the coil, which thus remains free, may be pushed out upon the endless conveyer by means of the pushing-head and its cylinder and be carried off upon said conveyer. The valves which control the supply and exhaust of the actuating medium to the two cylinders may be arranged close together, so that one operative may attend to the reeling, lowering of the mandrel, and removal of the finished coil. The mandrel and pushing-head may be operated sufficiently quick to admit of one finished coil being removed while the end of the next wire rod is being grasped and conducted into the reeling device. The wedge-shaped foot-flange of the pushing-head may easily engage beneath the coil, as the latter is supported upon the rails raised above the bed-plate. By passing through the guide-tube and over the face and edge of the coiling-cone and flange the wire rod will be sufficiently sprung forward and back to shake off and remove all scale upon it, so that the rod in the coil will be comparatively clean and smooth. The operation of reeling will be practically continuous, as the end of the following wire rod may be started into the apparatus while the completed coil is being removed, which latter operation will consume but a moment of time.

It is obvious that this coiling apparatus will exert no drawing strain upon the wire rod, but will simply coil the latter within the shield and around the mandrel at the same speed with which it leaves the rolls, and the coil will for that reason be free and regular, capable of being drawn up, coil upon coil, in a long spiral, which is a considerable advantage in the subsequent handling and treatment of the wire rod, which latter, in reeling apparatus having spoked reels, will be reeled into coils, one drawn into the other, by reason of the reeling apparatus operating with greater speed than the rolls which roll the rods. The cone and the wall will form open-sided coiling-guides open to face the direction in which the cone rotates. These open-sided guides will have the advantage over the closed guides which have heretofore been employed in wire-rod-coiling apparatus that the coiling-guides may be easily accessible in the case of obstruction caused by the wire snarling or kinking within said guides.

The coiling device will be comparatively light, of very simple construction, and as the coiling-guides are open for the greater portion of their length they will be more easily kept cool and will consequently not be as liable to wear and damage from constant contact with the hot rods as coiling-guides closed at all sides.

Figure 7:
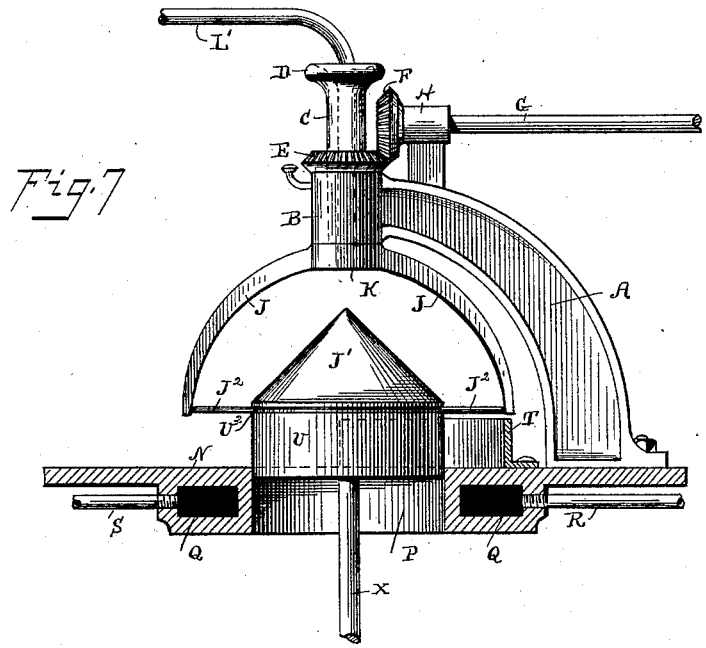

In Fig. 7 of the drawings is shown a modification of my apparatus, in which the coiling-cone J' is made in one piece with the mandrel, and the rod-coiling arms are separate from the coiling-cone and provided with radiating rollers $J^2$ at their lower ends, which rollers project with their inner ends into a circumferential groove $U^2$ in the mandrel at the base of the coiling-cone. The operation of this modified apparatus will be exactly similar to the operation of the preferred form illustrated in the preceding figures. The edge of the coiling-cone above the circumferential groove may be formed with two diametrically-opposite notches, with which the ends of the rollers may be brought to register when the cone and mandrel are lowered, or the rollers and arms may be sufficiently elastic to allow the ends of the rollers to spring out of or into the groove when the mandrel is lowered or raised.

Figure 8:
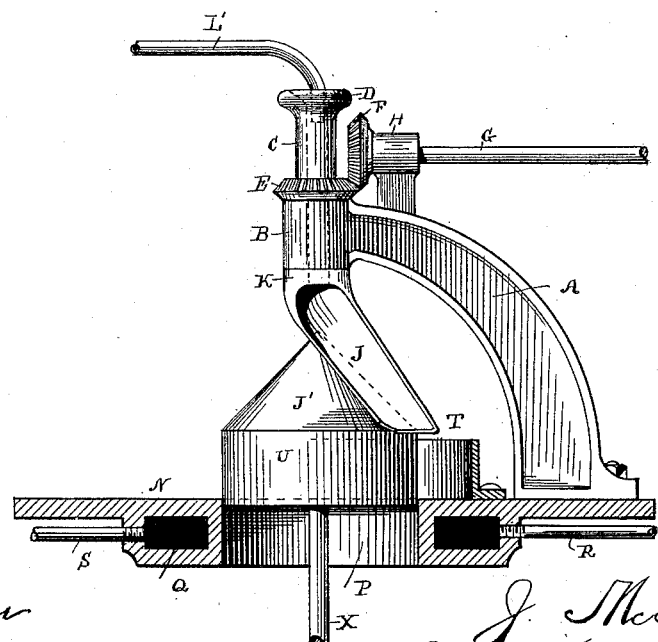
Figure 7:
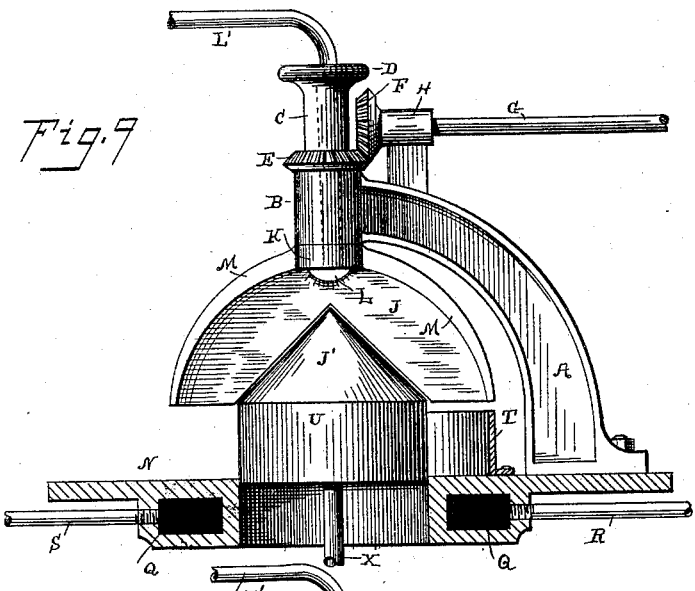

Another modification is illustrated in Fig. 8. In said figure the coiling-cone and mandrel are made in one piece and one coiling-guide J only is employed in this form. Said coiling-guide is in the form of an oblique open trough, and the wire rod slides down through the trough in exactly the same manner as down the oblique surface of the coiling-cone and is coiled around the mandrel. The coiling-cone may be entirely dispensed with in this form, as the guide-trough alone receives the wire rod.

In Fig. 9 the coiling-cone and mandrel are shown made in one piece, and the wall or coiling-guides J straddle and revolve over the coiling-cone. The operation of this modified form of the apparatus is exactly like the operation of the preferred form.

Figure 10:
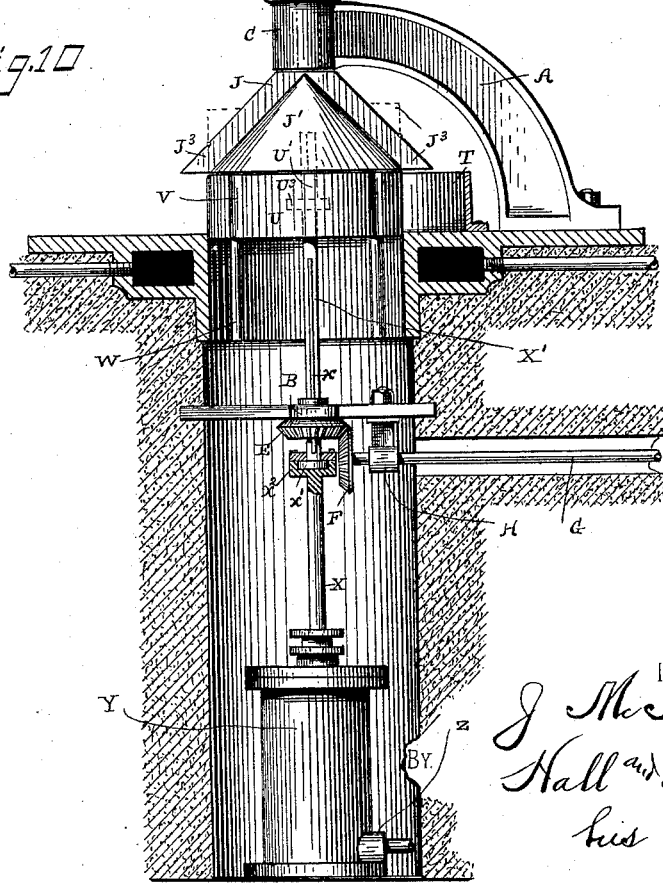

In Fig. 10 the apparatus is illustrated in another modified form. The mandrel is vertically sliding and has an axial bearing U', (indicated in dotted lines,) which is formed with an enlargement $U^3$. The upper portion X' of the piston-rod X is journaled in said bearing and has a collar which fits into said enlargement, so that the mandrel may be moved up or down by the piston-rod, while the latter may freely revolve within the bearing. The cone J' is secured upon the upper end of said shaft or piston-rod extension X' and has walls or coiling-guides J, the lower triangular corners $J^3$ of which are so hinged that they may be tilted upward on striking the bed-plate when the mandrel and cone are lowered, so as to offer no obstruction to said parts being lowered when the coil is finished, while they will admit of the flanges retaining their full width at the lower ends when coiling. The vertical guide-tube C is rigid and does not revolve as in the other forms shown. The shaft or piston-rod extension X' is formed with a feather $x$ and slides with this feather in the bevel cog-wheel E, which is journaled with its neck in the vertical bearing B and is driven by cog-wheel F and shaft G. The lower end of said shaft or rod extension has a collar $x'$, which revolves within a closed box $x^2$ upon the piston-rod X. By constructing the apparatus in this manner the guide-tube will be stationary, and the coiling-cone may be revolved by the piston-rod extension from gearing below the bed-plate. While said shaft or rod extension will revolve, the mandrel will remain stationary, but can be raised or lowered by the same. The piston-rod proper will not revolve on account of the arrangement of the box $x^2$, which will allow the rod-extension to revolve and yet be raised or lowered by the piston-rod. It is preferable to make the bed-plate or the rails upon the same slightly inclined toward the conveyer, so that the pushing-head may easily push the bundle or coil of finished wire upon the same.

I have in this description employed the word "cone" not in its strictly mathematical sense, but to indicate, broadly, any upwardly-tapering form, whether constructed by the revolution of a straight or curved side of a right-angled triangle upon its cathetus and whether of a regular or of an irregular form.

The foregoing description and accompanying drawings set forth in detail mechanism embodying my invention. Change may be made therein provided the principles of construction respectively recited in the following claims are employed.

I therefore particularly point out and distinctly claim as my invention—

1. In metal-coiling apparatus, a revolving coiling-guide formed with an open side, substantially as set forth.

2. In metal-coiling apparatus, a rotary coiling-guide having its side open in the direction of its movement, substantially as set forth.

3. In metal-coiling apparatus, a rotary coiling-guide having its discharging-end portion formed angular to its receiving-end portion, said guide having its receiving-end portion formed with a closed side and having its remaining portion formed with an open side, substantially as set forth.

4. In metal-coiling apparatus, a rotary coiling-guide having its receiving-end portion formed with a closed side and located axially to its line of rotation and having its remaining portion located in outward projection from said axial line and formed with an open side, substantially as set forth.

5. In metal-coiling apparatus, the combination, with suitable rotating mechanism, of a rotary coiling-guide having its discharging extremity located out of line with its receiving extremity, said guide having its main body portion formed with that side open which faces the direction of its rotary movement, substantially as set forth.

6. In metal-coiling apparatus, a rotary coiling-cone having an exposed outer surface along which the rod travels, a hollow collar, and driving-gear, substantially as set forth.

7. In metal-coiling apparatus, a rotary coiling-cone provided with a longitudinal wall upon its face, substantially as set forth.

8. In metal-coiling apparatus, a rotary coiling-cone provided with a longitudinal wall upon its face and a guide-tube at its apex, substantially as set forth.

9. In metal-coiling apparatus, a rotary coiling-cone having a longitudinal wall with a lateral flange, substantially as set forth.

10. In metal-coiling apparatus, a rotary coiling-cone having two longitudinal walls with lateral flanges, substantially as set forth.

11. In metal-coiling apparatus, a coiling device consisting of a rotary guide-tube open at both ends and having a funnel-shaped mouth-piece, a cone secured to the lower open end of said guide-tube, and walls upon said cone extending from the apex to the lower edge of the same and having a sweep in the direction opposite to the direction of rotation, substantially as set forth.

12. In apparatus for coiling wire rods, a coiling device consisting of a rotary guide-tube open at both ends and having a funnel-shaped mouth-piece, a cone, and a flange straddling said cone having a rounded outer edge, a lateral flange upon said edge, a collar above the apex of the cone for attaching it to said guide-tube, an opening below said collar having beveled or rounded edges and registering with the open lower end of the guide-tube, and a curve or sweep of its legs in a direction opposite to the direction of rotation, substantially as set forth.

13. In apparatus for coiling wire rods, the combination of a bed, a mandrel or core upon which the coil is wound, withdrawably arranged in said bed, and a pushing-head arranged to be slid across said bed, substantially as set forth.

14. In an apparatus for coiling wire rods, the combination, with a bed, a mandrel withdrawably arranged in said bed, and a coiling device, of a pushing-head arranged to be slid across said bed, substantially as set forth.

15. In an apparatus for coiling wire rods, the combination, with a horizontal bed-plate, a coiling device above said bed-plate, and a mandrel vertically reciprocating in said bed-plate beneath said coiling device, of a pushing-head arranged to slide horizontally across said bed-plate, substantially as set forth.

16. In an apparatus for coiling wire rods, the combination, with a horizontal bed-plate, a horizontally-revolving coiling device above said bed-plate, a mandrel sliding vertically in said bed-plate beneath said coiling device, and a cylinder and piston for reciprocating said mandrel, of a pushing-head sliding across the face of said bed-plate and the upper end of the lowered mandrel, and a cylinder and piston for reciprocating said head, substantially as set forth.

17. In an apparatus for coiling wire rods, the combination, with a horizontal bed-plate formed with an opening, a horizontally-rotating coiling device above said opening, a cylinder and piston-rod beneath said opening, and a mandrel connected to and supported from said piston-rod to slide in said opening and to have its upper end flush with said bed-plate, of a horizontal cylinder and piston arranged radially to the opening in the bed-plate, and a pushing-head sliding upon said plate and connected to said piston, substantially as set forth.

18. In an apparatus for coiling wire rods, the combination, with a horizontal bed-plate formed with an opening, a horizontally-rotating coiling device above said opening, a cylinder and piston-rod beneath said opening, and a mandrel secured to the end of said piston-rod to slide in said opening, of a horizontal cylinder and piston-rod arranged at the side of said bed-plate and radially to said opening, rods secured by a cross-head to the end of said piston-rod and parallel to the sides of said cylinder, and a pushing-head secured to the inner ends of said rods, sliding upon said bed-plate and lowered mandrel, and provided with a wedge-shaped flange at its base, substantially as set forth.

19. In an apparatus for coiling wire rods, the combination of a withdrawable mandrel or core, a coil-pushing head traveling in a horizontal plane over the withdrawn mandrel, and an endless conveyer traveling in the same plane as the coil-pushing head and at the end of its stroke, substantially as set forth.

20. In an apparatus for coiling wire rods, the combination of a bed-plate, a mandrel withdrawably sliding in an opening in the same, a coil-pushing head sliding across said bed-plate and withdrawn mandrel, and an endless coil-conveyer traveling at a level with said bed-plate and at the end of the stroke of said pushing-head, substantially as set forth.

In testimony that I claim the foregoing to be my invention I have hereunto set my hand this 18th day of September, A. D. 1890.

JOHN McILVRIED.

Witnesses:
J. B. FAY,
ROBERT POWELL.